United States Patent [19]

Schmid

[11] E Patent Number: Re. 32,965

[45] Reissued Date of Patent: Jun. 27, 1989

[54] FUEL INJECTION PUMP FOR INTERNAL COMBUSTION ENGINES

[75] Inventor: Walter Schmid, Munich, Fed. Rep. of Germany

[73] Assignee: Robert Bosch GmbH, Stuttgart, Fed. Rep. of Germany

[21] Appl. No.: 76,464

[22] Filed: Jul. 22, 1987

Related U.S. Patent Documents

Reissue of:

[64] Patent No.: 4,587,940
Issued: May 13, 1986
Appl. No.: 730,617
Filed: May 6, 1985

[30] Foreign Application Priority Data

Jul. 31, 1984 [DE] Fed. Rep. of Germany ..... 3428176

[51] Int. Cl.[4] ..... F02M 59/20

[52] U.S. Cl. ..... 123/503; 123/500; 123/449; 417/289

[58] Field of Search ..... 123/500, 501, 503, 449, 123/385, 386, 387, 373, 506, 504, 446; 417/289

[56] References Cited

U.S. PATENT DOCUMENTS

| | | | |
|---|---|---|---|
| 1,886,930 | 11/1932 | Alder | 123/503 |
| 2,147,390 | 2/1939 | Vandet | 123/501 |
| 3,348,488 | 10/1967 | Wolff | 123/500 |
| 3,758,241 | 9/1973 | Ehein | 123/503 |
| 3,791,361 | 2/1974 | Hofman | 123/500 |
| 3,999,529 | 12/1976 | Davis | 123/500 |
| 4,146,178 | 3/1979 | Bailey | 123/500 |
| 4,413,600 | 11/1983 | Yanagawa et al. | 123/503 |
| 4,499,883 | 2/1985 | Miyaki | 123/503 |

FOREIGN PATENT DOCUMENTS

| | | | |
|---|---|---|---|
| 3018791 | 11/1981 | Fed. Rep. of Germany | 123/449 |
| 126828 | 10/1979 | Japan | 123/503 |
| 359603 | 10/1931 | United Kingdom | 123/449 |
| 371685 | 4/1932 | United Kingdom | 123/503 |
| 403981 | 12/1933 | United Kingdom | 123/500 |
| 1395384 | 5/1975 | United Kingdom | 123/503 |

*Primary Examiner*—Carl Stuart Miller
*Attorney, Agent, or Firm*—Edwin E. Greigg

[57] ABSTRACT

A fuel injection pump is proposed for internal combustion engines having a pump piston having a blind bore and two control bores and in which the fuel quantity to be supplied is controlled by means of a control slide having oblique control edges. At least two control edges are provided in a window-like recess of the control slide, of which the lower edge in each case and possibly the upper one as well extend obliquely; the upper control edge provided in the recess determines the supply onset, in cooperation with the first control bore, and the lower control edge of the recess determines the end of supply, in cooperation with the second control bore.

11 Claims, 3 Drawing Sheets

FUEL INJECTION PUMP FOR INTERNAL COMBUSTION ENGINES

Matter enclosed in heavy brackets [ ] appears in the original patent but forms no part of this reissue specification; matter printed in italics indicates the additions made by reissue.

BACKGROUND OF THE INVENTION

The invention is based on a fuel injection pump as generally defined hereinafter. In a known fuel injection pump of this kind (U.S. Pat. No. 2,147,390) the control slide has oblique control edges on its upper and lower end edges; the upper control edge, by the entry of the lower control bore extending in the pump piston determines the supply onset and the upper control edge, by the emergence of the upper control bore extending in the pump piston determines the end of supply. As a result, the control slide becomes relatively long in structure, which is a considerable disadvantage in slide-controlled fuel injection pumps, which are already relatively large. Furthermore, an extra impact plate must be provided opposite the mouth of the upper control bore where it emerges from the control slide. A further disadvantage in terms of filling the pump work chamber during the intake stroke is that a control bore can only be opened near bottom dead center; given the relatively low filling pressures at high rpm, either this can lead to an inadequate filling of the pump work chamber, or it necessitates relatively large control bore cross sections, with the disadvantages of a larger idle volume in the first instance and a dependency of the control quality on the rpm in the second, the latter because the cross section varies over time on account of the relatively large control bore cross section.

OBJECT AND SUMMARY OF THE INVENTION

The fuel injection pump according to the invention and having the characteristics of the main claim has the advantage over the prior art that the control slide, and the height of the aperture receiving the control slide, can be embodied relatively short, with advantageous results for the overall structural length of the injection pump. Because the sliding surfaces between the control slide and the pump piston remain relatively large, the frictional forces become less, and the masses involved are reduced by the type of construction; this makes it easier to adjust the control slide. Since the diverted fuel flows out through the recess, there is no structural difficulty in providing impact plates opposite the control bores.

According to an advantageous embodiment of the invention, the pump piston is rotatable in order to vary the supply quantity and the control slide is axially displaceable in order to shift the supply onset, both in a known manner [ie the rotation and axial displacement are effected in a known manner]. The pump piston can be rotated by conventional rotational means, for instance a governor rod, about the angle which determines the fuel quantity. Solely for adjustment purposes, the control slide is rotated slightly with respect to its rotational position, while contrarily, for the purpose of varying the injection onset, which is determined by the supply onset, the control slide is axially displaceable. As a result, the association of the control variables for the supply quantity and for the supply onset can be accomplished separately and very accurately.

According to a further feature of the invention, the oblique control edge extends obliquely, with an inclination opposite that of the lower control edge, so that the supply onset occurs earlier as the supply quantity increases. By appropriate association of the inclinations, the earlier injection onset (supply onset) conventionally desired with increasing load, or in other words with an increasing injection quantity, can be attained without having to displace the control slide axially to do so. An axial displacement is thus undertaken only if this is required by the performance graph of the injection, which can vary with different engines.

According to a further feature of the invention, the distance between the control bores is greater than the width of the web of the control slide between the upper control edge and the lower end edge, but less than the distance between the lower control edge and the upper end edge. As a result, after the first bore has been opened by the upper control edge the second control bore is open toward the recess, so that as the compression stroke of the pump piston continues the diverted fuel can escape via two bores, which results in a substantial relief of pressure; furthermore, during the ensuing intake stroke two bores are available, at least intermittently, for filling the pump work chamber.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
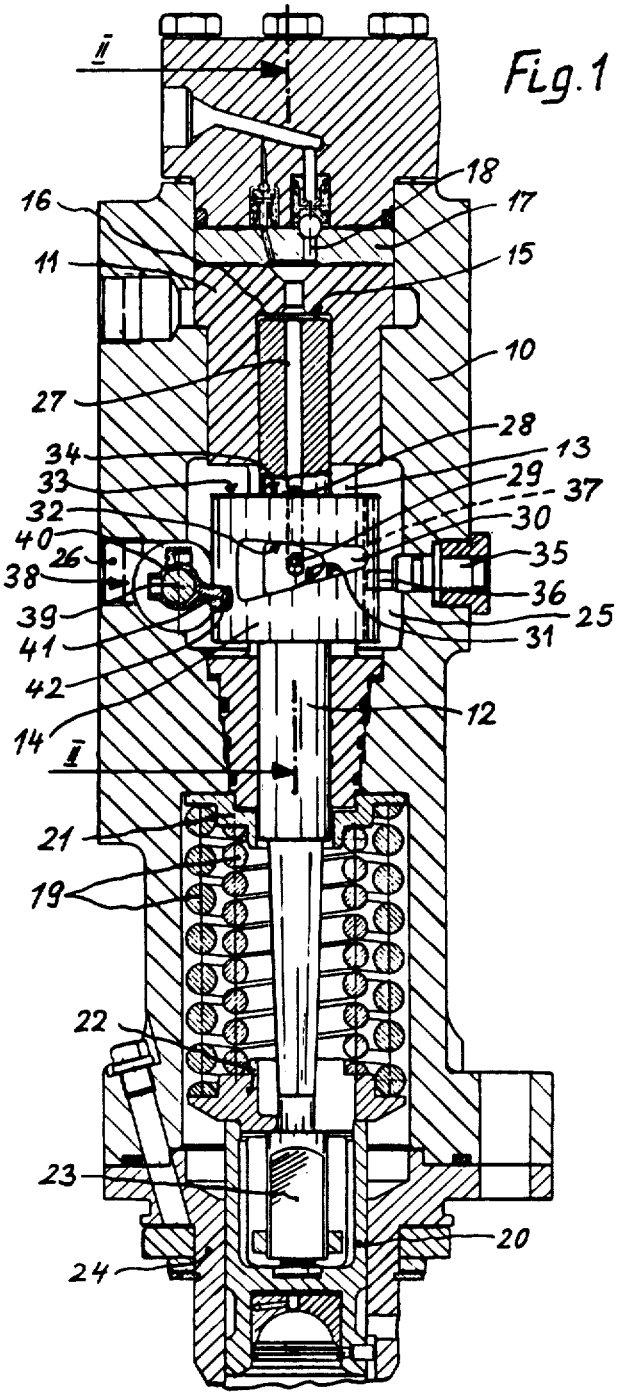
FIG. 1 is a longitudinal cross-section taken through a one-cylinder fuel injection pump according to the invention.

The exemplary embodiment shown here in a fuel injection pump of the type shown in FIG. 1 which is externally driven by an engine camshaft and inserted into the engine block. Naturally the invention can also be realized in other suitable fuel injection pumps, such as in-line pumps.

In the exemplary embodiment, a cylinder bushing 11 is inserted into a pump housing 10 which is flanged to a crankshaft housing (not shown), and a pump piston 12 is guided in an axially displaceable and rotable manner in the cylinder bushing 11. In an aperture 13 of the cylinder bushing 11, a control slide 14 is disposed on the pump piston 12 such that it is axially displaceable and rotatable. With its upper end face 15, the pump piston 12 defines a pump work chamber 16 which is closed by a cover plate 17 in which a pressure line 18 leading to a pressure valve (not shown) and pressure lines communicating with the engine cylinders extends.

The pump piston 12 is driven in a known manner via a tappet 20 guided in the pump housing 10 and movable counter to the force of two tappet springs 19. The springs 19 are supported at the top on the pump housing 10 via a spring plate 21 and at the bottom on the tappet 20 via a second spring plate 22. The lower part of the piston 12 which is guided in the tappet 20 has flattened areas 23 intended to be engaged by a rotating device, so that the pump piston 12 can be rotated independently of the tappet 20. The pump housing 10 is closed at the bottom by a flange-like lid 24, in which the tappet 20 is guided.

In the region around the control slide 14, the housing 10 is widened slightly, in order to form a suction chamber 25, which is supplied with fuel under a slight predetermined pressure via a bore 26. A blind bore 27 is disposed in the pump piston 12. At one end the blind bore 27 terminates at the end face 15, discharging into the pump work chamber 16, and has two transverse bores, that is, an upper control bore 28 and a lower control bore 29. By means of the blind bore 27 and the transverse bores 28 and 29, which form a conduit for the inflow and outflow of the fuel, the pump work chamber 16 and the suction chamber 25 can be made of communicate with one another. This communication is controlled by the control slide 14, which has two opposing recesses 30 in its jacket. These recesses 30 each include a lower control edge 31 and an upper control edge 32, these edges defining the recess. The two control edges 31 and 32 have opposite inclinations, with the lower control edge 31 being relatively steep and the upper control edge contrarily extending relatively flat. A further control edge is embodied by the end control edge 34 of the end face 33 of the control slide 14.

Figure 6:
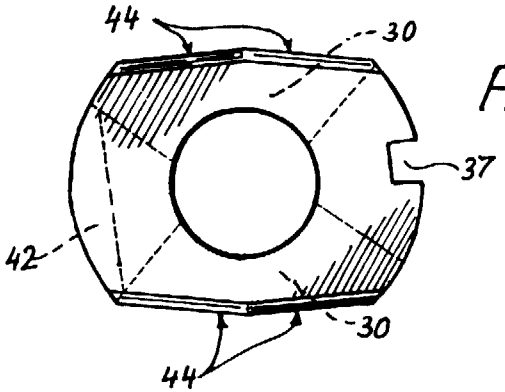

To establish the basic position of the control slide 14 in the rotational direction, the control slide 14 is adjusted via an eccentric element 35, which is rotatably guided in the housing 10 and with a pin 36 engages a longitudinal groove 37 in the control slide 14. The axial displacement of the control slide 14 is undertaken via an injection onset adjuster 38, in which an actuating lever 40 is secured with coupler means 41 on a shaft 39 supported in the housing. The coupler means 41 engages a transverse groove 42 on the jacket face of the control slide 14. In order to be able to make the basic adjustment of the control slide 14 inside the aperture 13, the jacket faces 14 of the control slide 14 facing the walls 43 of the aperture are bevelled, as shown in FIG. 6.

Figure 2:
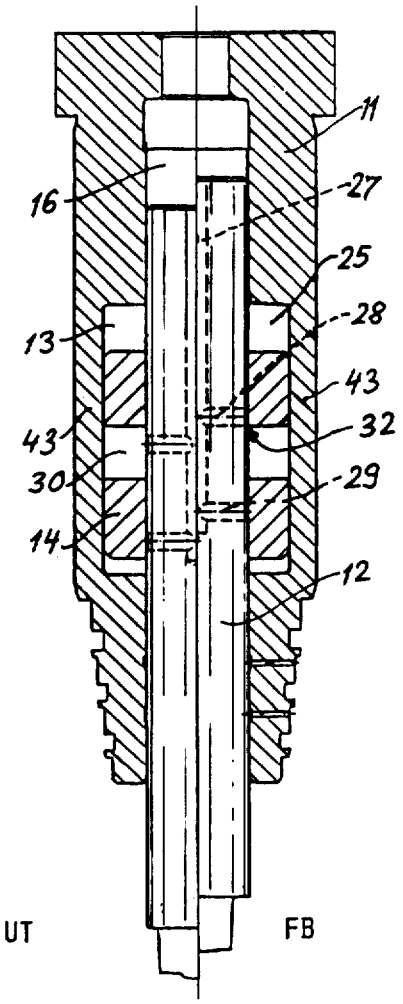
FIGS. 2 and 3 are longitudinal sections taken through a portion of the pump along the line II—II of FIG. 1, showing different stroke positions of the pump piston on a larger scale.
Figure 3:
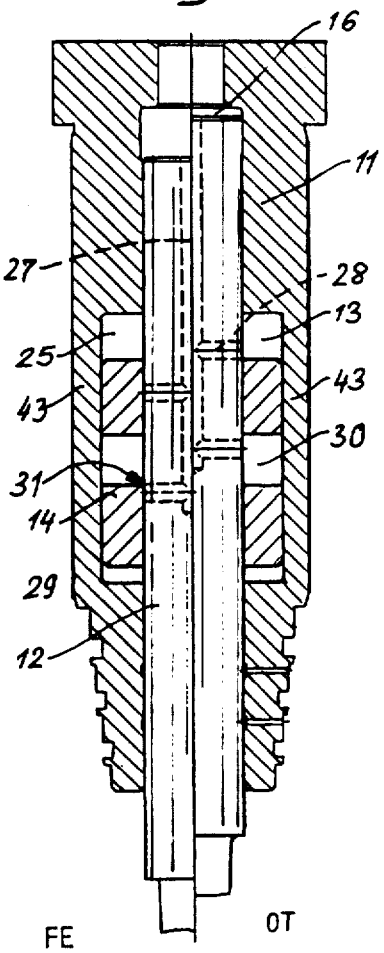

As long as both control bores 28 and 29 are closed by the control slide 14, the supply of fuel and hence fuel injection into the engine can take place. As long as at least one of the control bores is open, the pump work chamber 16 communicates with the suction chamber 25, and [neither can] *either* the pump work chamber 16 *can* be filled from the suction chamber 25, [nor can] *or* a return flow of the fuel from the pump work chamber 16 back to the suction chamber 25 *can* take place. In FIGS. 2 and 3, four different stroke positions of the pump piston 12 are shown; for the sake of explanation these positions, only the pump piston 12, the cylinder bushing 11 and the control slide 14 are shown. The stroke positions, from left to right, are as follows: FIG. 2, bottom dead center (UT) and supply onset (FB); and FIG. 3, end of supply (FE) and top dead center (OT). In all four stroke positions of the piston, UT, FB, FE and OT, for the sake of easier comprehension of the ensuing explanation of the function the control slide 14 is shown in this same position. While in the UT position a filling of the pump work chamber 16 takes place from the suction chamber 25 and the aperture 13, that is, the recess 30, and from there via the upper control bore 28 and the blind bore 27, in the FB position both control bores 28 and 29 are blocked. Beyond this FB position, for the rest of the compression stroke of the pump piston 12 fuel is delivered to the engine from the pump work chamber 16. Beyond the FE position, the end of supply is initiated (that is, the injection is interrupted) by means of the lower control bore 29 cooperating with the lower control edge 31; the mouth of the lower control bore 29 enters into the recess 30, so that the fuel can flow from the pump work chamber 16 into the blind bore 27 and the control bore 29 into the recess 30, or back into the suction chamber 25. In the OT position, both control bores 28 and 29 are then opened up, so that the pump work chamber 16 has a connection of the largest possible cross section with the suction chamber 25. This connection also remains open during the first stroke segment of the pump piston.

Depending on the rotational position of the pump piston 12, that is, depending on the association between the control bores 28, 29 with respect to the recess 30, the stroke segment between FB and FE, in which the two control bores 28 and 29 are blocked, varies, and hence the quantity supplied to the engine varies as well. By axially displacing the control slide 14, the upper control bore 28 is closed earlier or later solely in the FB position, and accordingly the lower control bore 29 is opened earlier or later in the same ratio, so that there is no variation in the quantity resulting from this shift in the injection onset.

Figure 5:
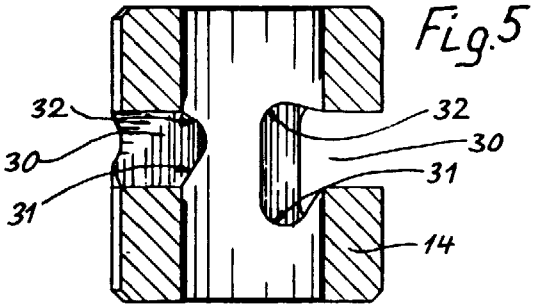
FIGS. 4, 5 and 6 are two longitudinal sections and a plan view, respectively, of the control slide on a larger scale.
Figure 4:
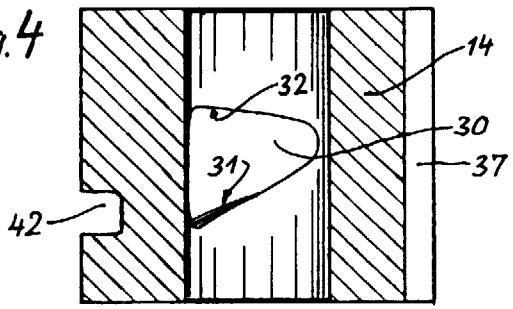

As shown by the sectional views of the control slide in FIGS. 4 and 5, two recesses 30 are provided axially symmetrically, and they correspond respectively with two mouths of the control bores 28 and 29. As a result, a radial balancing of forces is attained in a known manner between the control slide 14 and the pump piston 12.

The foregoing relates to a preferred exemplary embodiment of the invention, it being understood that other variants and embodiments thereof are possible within the spirit and scope of the invention, the latter being defined by the appended claims.

What is claimed and desired to be secured Letters Patent of the United States is:

1. A fuel injection pump provided with a housing for internal combustion engines comprising at least one pump piston defining a pump work chamber, a control slide having at least one oblique control edge axially displaceable on said pump piston, said control slide adapted to control two control bores arranged to discharge in an axially spaced manner on a jacket face of said pump piston and further adapted to communicate via a conduit with said pump work chamber, said bores adapted to control supply onset and end of supply, at least one window-like recess in said control slide, said recess having a lower oblique control edge and an upper control edge which limit said recess, whereby at bottom dead center (UT) of said pump piston one of said bores is uncovered by said recess and [said other bore] for said supply onset is covered by said upper control edge and further that said end of supply is effected by means of the uncovering of said other bore by means of said lower oblique control edge.

2. A fuel injection pump as defined by claim 1, further wherein said housing includes a bushing, an aperture in said bushing, said slide axially displaceable and rotatable and disposed in said aperture, said control slide arranged to receive said pump piston whereby to adjust supply onset, said pump piston further adapted to rotate in order to vary fuel supply quantity.

3. A fuel injection pump as defined by claim 1 further wherein said upper control edge extends obliquely and further includes a slight inclination opposite that of said lower control edge so that with an increasing supply quantity fuel supply onset occurs earlier.

4. A fuel injection pump as defined by claim 2, further wherein said upper control edge extends obliquely and further includes a slight inclination opposite that of said lower control edge so that with an increasing supply quantity fuel supply onset occurs earlier.

5. A fuel injection pump as defined by claim 1, further wherein said control slide has a web width which is less than the distance between said control bores [and also less than the distance between said lower control edge and said upper control edge].

6. A fuel injection pump as defined by claim 1, further wherein said control bores and said recess are arranged in axially symmetrical pairs.

7. A fuel injection pump as defined by claim 2, further wherein said control slide has a bevelled zone, whereby limited rotation thereof is achievable.

8. A fuel injection pump as defined by claim 3, further wherein said control slide has a bevelled zone, whereby limited rotation thereof is achievable.

9. A fuel injection pump as defined by claim 4, further wherein said control slide has a bevelled zone, whereby limited rotation thereof is achievable.

10. A fuel injection pump as defined by claim 5, further wherein said control slide has a bevelled zone, whereby limited rotation thereof is achievable.

11. A fuel injection pump as defined by claim 6, further wherein said control slide has a bevelled zone, whereby limited rotation thereof is achievable.

* * * * *